A. E. ASHLEY.
HOOD LIFT MOTOR VENTILATOR.
APPLICATION FILED JULY 1, 1918.

1,308,923.

Patented July 8, 1919.

UNITED STATES PATENT OFFICE.

ARTHUR E. ASHLEY, OF BOISE, IDAHO.

HOOD-LIFT MOTOR-VENTILATOR.

1,308,923.  Specification of Letters Patent.  Patented July 8, 1919.

Application filed July 1, 1918. Serial No. 242,818.

*To all whom it may concern:*

Be it known that I, ARTHUR E. ASHLEY, a citizen of the United States of America, and resident of Boise, in the county of Ada and State of Idaho, have invented certain new and useful Improvements in Hood-Lift Motor-Ventilators, of which the following is a specification.

This invention relates to automobiles and particularly to a device adapted to support hoods of automobiles in open positions to permit the escape of heat while at the same time holding the said hood so that it will operate to protect the motor from rain or mud, or falling leaves, twigs or branches and from the sun's rays.

An object of this invention is to provide novel means for holding the hinged sections of hoods with their edges elevated while at the same time the hood is held against undue vibration while being so supported and the said device may constitute an attachment or may be a regular part of the equipment of an automobile.

A further object of this invention is to provide a hood holder and lock comprising a rotatable support operative by leverage to press itself into engagement with the parts of the hood for accomplishing the result stated.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1:
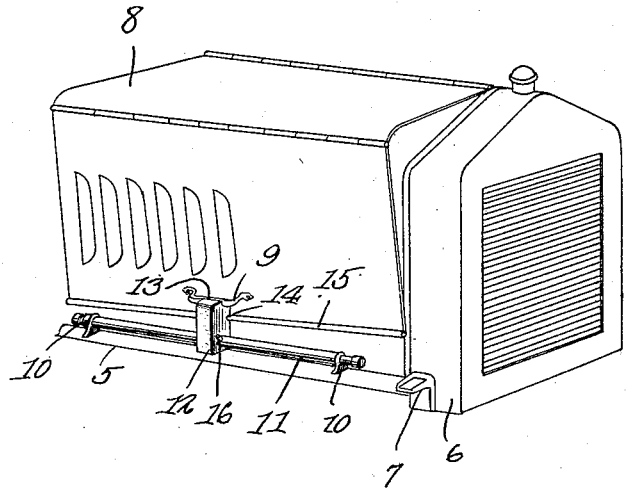
Figure 2:
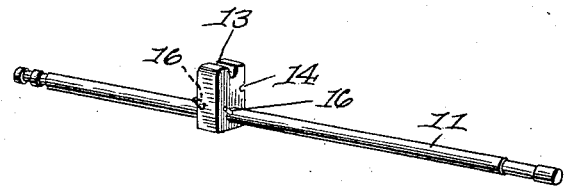

Figure 1 illustrates a perspective view of a fragment of an automobile showing the invention applied thereto; and Fig. 2 illustrates a perspective view of the hood supporting member and the mounting therefor.

In these drawings 5 denotes the side frame, 6 the radiator and 7 the bracket irons which may be of any conventional form and therefore the inventor is not to be limited with respect to these elements nor does the inventor wish to be restricted with regard to the hood 8 which may be of any type having hinged joints to permit the lifting of the hood with respect to the frame.

The hood 8, in the present embodiment, is provided with the usual handle 9 and the frame 5 of the automobile has brackets 10 mounted on it adapted to hold the rod 11, the said rod 11 being rotatable in the brackets as shown in this embodiment, but it is to be understood that if desired the rod 11 can be made stationary, as will presently appear.

A hood engaging block or member 12 is mounted on the rod 11 and is provided with a notch 13 in its upper end which constitutes a seat for the handle 9 when the hood is lifted and supported. Furthermore, the member 12 has a notch 14 in its side constituting a seat for a bead 15 of the hood 8, the said member 12 operating to engage the said handle and bead so that leverage is exerted to force the free edge of the hood inwardly so that it will engage the radiator and be held against undue vibration. In this embodiment of the invention, the member 12 may be stationary on the rod 11, although it is possible to make the device so that the rod is stationary and the member 12 is rotatable on it as thereby practically the same results will be attained. The member 12 is held against movement longitudinally of the rod 11 by means of the pins such as 16 which have ends embedded in the rod and which project therefrom to engage the sides of the member 12.

The device described which may be aptly termed a hood lift motor ventilator makes it possible to utilize the ordinary hood while at the same time holding it open so that the heated air which usually accumulates under the hood of a motor car as the result of combustion will be speedily driven off.

Many expedients have been resorted to for accomplishing this result, such as cutting off the lower ends of the hoods or removing the hoods altogether, but such methods leave the motor unprotected against the direct rays of the sun and take away the protection afforded by the hood against rain or splashing mud or water.

The invention forming the subject of this application supports the hood sections from the bottom and firmly locks the hood in position which allows the cooled air to come in at the bottom and to be driven out at the top.

The attachment can be readily applied to or removed from automobiles now in common use and permits the hood sections to be completely opened when it is desired to have access to the motor.

I claim:

1. In a hood supporting device, a rod, a block rotatably supported by the rod, means for holding the rod in fixed relation to a frame of the automobile, said block having a notch to receive a portion of the hood.

2. In a hood supporting device, a rod, a block rotatably supported by the rod, means for holding the rod in fixed relation to a frame of the automobile, said block having notches to engage a handle of a hood and a bead of a hood respectively.

ARTHUR E. ASHLEY.

Copies of this patent may be obtained for five cents each, by addressing the "Commissioner of Patents, Washington, D. C."